(12) United States Patent
Bi et al.

(10) Patent No.: US 11,703,729 B2
(45) Date of Patent: Jul. 18, 2023

(54) DISPLAY DEVICE

(71) Applicants: Beijing BOE Optoelectronics Technology Co., Ltd., Beijing (CN); BOE Technology Group Co., Ltd., Beijing (CN)

(72) Inventors: Yao Bi, Beijing (CN); Xiaojuan Wu, Beijing (CN); Jinshuai Duan, Beijing (CN); Jiaxing Wang, Beijing (CN); Wei Zhao, Beijing (CN); Hongliang Yuan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/481,560

(22) Filed: Sep. 22, 2021

(65) Prior Publication Data
US 2022/0121070 A1 Apr. 21, 2022

(30) Foreign Application Priority Data
Oct. 16, 2020 (CN) .......................... 202022318092.1

(51) Int. Cl.
*G02F 1/1362* (2006.01)
*G02F 1/1368* (2006.01)

(52) U.S. Cl.
CPC ...... *G02F 1/136209* (2013.01); *G02F 1/1368* (2013.01); *G02F 1/136213* (2013.01)

(58) Field of Classification Search
CPC ......... G02F 1/136209; G02F 1/136213; G02F 1/1368; G02F 1/1343; G02F 1/1334; G02F 1/133606; G02F 1/13345; G02B 6/005
See application file for complete search history.

(56) References Cited

U.S. PATENT DOCUMENTS

2003/0038904 A1 * 2/2003 Kaneko ............. G02F 1/133512
349/110
2003/0218701 A1 * 11/2003 Kawakami ........ G02F 1/133615
349/65

(Continued)

FOREIGN PATENT DOCUMENTS

CN 1260592 A * 7/2000 ......... H01L 27/1237
CN 108153031 A * 6/2018
(Continued)

*Primary Examiner* — Hoan C Nguyen
(74) *Attorney, Agent, or Firm* — Nath, Goldberg & Meyer; Joshua B. Goldberg (57) ABSTRACT

The present disclosure provides a display device including: a display panel having a display region and a peripheral region surrounding the display region, the display panel including: an array substrate, an opposite substrate and a liquid crystal layer, wherein the array substrate and the opposite substrate are opposite to each other, the liquid crystal layer is between the array substrate and the opposite substrate, a light shielding layer is on a side of at least one of the array substrate and the opposite substrate proximal to the liquid crystal layer, and an orthographic projection of the light shielding layer on the array substrate is located in the peripheral region; and a light source configured to emit light to a lateral side of the display panel, the light being incident into the liquid crystal layer from the lateral side of the display panel.

11 Claims, 3 Drawing Sheets

(56) References Cited

U.S. PATENT DOCUMENTS

2016/0377911 A1* 12/2016 Wu .................. G02F 1/1339
                                                349/106
2018/0031875 A1* 2/2018 Qin .................. G02F 1/195

FOREIGN PATENT DOCUMENTS

| | | | | | |
|---|---|---|---|---|---|
| CN | 104991373 B | * | 8/2019 | ............ | G02F 1/133 |
| JP | H02111922 A | * | 4/1990 | | |
| JP | H05107550 A | * | 4/1993 | | |
| JP | 2000066180 A | * | 3/2000 | | |
| JP | 2002156653 A | * | 5/2002 | | |
| JP | 2003057632 A | * | 2/2003 | ....... | G02F 1/133512 |
| JP | 2003255345 A | * | 9/2003 | | |
| JP | 2008186656 A | * | 8/2008 | | |

* cited by examiner

DISPLAY DEVICE

CROSS REFERENCE TO RELATED APPLICATIONS

The present application claims the priority of the Chinese Patent Application No. 202022318092.1 filed on Oct. 16, 2020, the content of which is incorporated herein by reference in its entirety.

TECHNICAL FIELD

The present disclosure relates to the field of display technology, and in particular to a display device.

BACKGROUND

At present, transparent display is more and more widely applied to smart home, wearing and on-vehicle applications. In some transparent display devices, a light source supplies light to a liquid crystal layer from one side of a display panel. When no voltage is applied to the display panel, the light is propagated in a horizontal direction in the liquid crystal layer, and the display panel is in a transparent state; when a driving voltage is applied to the display panel, light is scattered in the liquid crystal layer, and the display panel is in a display state. The current transparent display device has the problem of light leakage at edges of a display region.

SUMMARY

The present disclosure provides a display device.

The present disclosure provides a display device including:

a display panel having a display region and a peripheral region surrounding the display region, the display panel including: an array substrate, an opposite substrate and a liquid crystal layer, wherein the array substrate and the opposite substrate are opposite to each other, the liquid crystal layer is between the array substrate and the opposite substrate, a light shielding layer is on a side of at least one of the array substrate and the opposite substrate proximal to the liquid crystal layer, and an orthographic projection of the light shielding layer on the array substrate is located in the peripheral region; and a light source configured to emit light to a lateral side of the display panel, the light being incident into the liquid crystal layer from the lateral side of the display panel.

In some embodiments, the light shielding layer is a reflective layer, and the light source is on a lateral side of the opposite substrate to emit light towards the side of the opposite substrate.

In some embodiments, the light shielding layer is in the peripheral region of the array substrate.

In some embodiments, the array substrate includes: a first substrate and a first transistor on the first substrate, wherein the first transistor is in the peripheral region, the light shielding layer is between the first transistor and the liquid crystal layer, and an orthographic projection of the light shielding layer on the first substrate covers an orthographic projection of a channel portion of the first transistor on the first substrate.

In some embodiments, a plurality of pixels are in the display region, and a second transistor is on the first substrate at a position corresponding to each of the pixels, an active layer of the second transistor including: a source connection portion, a drain connection portion, and a channel portion between the source connection portion and the drain connection portion, the source connection portion being connected to a source of the second transistor, the drain connection portion being connected to a drain of the second transistor; and a first passivation layer is on a side of the second transistor distal to the first substrate, wherein a light shielding block is on a side of the first passivation layer distal to the first substrate, and an orthographic projection of the light shielding block on the first substrate at least covers an orthographic projection of the channel portion of the second transistor on the first substrate.

In some embodiments, a pixel electrode is on the first substrate at a position corresponding to the pixel, and a second passivation layer is on a side of the light shielding block distal to the first substrate; wherein the pixel electrode is on a side of the second passivation layer distal to the first substrate and is connected to a drain of the second transistor through a via extending through the first passivation layer and the second passivation layer; and a storage capacitor electrode is between the first passivation layer and the second passivation layer, wherein the storage capacitor electrode and the pixel electrode form a storage capacitor.

In some embodiments, the light shielding block and the light shielding layer are in a same layer and made of a same material.

In some embodiments, the display panel further includes a frame sealing adhesive between the array substrate and the opposite substrate, the frame sealing adhesive surrounds the liquid crystal layer, and an orthographic projection of the frame sealing adhesive on the array substrate is within an orthographic projection of the light shielding layer on the array substrate.

In some embodiments, the opposite substrate includes: a second substrate and a common electrode on the second substrate, wherein the common electrode is between the frame sealing adhesive and the second substrate and is in contact with the frame sealing adhesive.

In some embodiments, the light shielding layer is a metal layer.

In some embodiments, the light shielding layer is a light-absorbing layer on the opposite substrate; and the light source is on a side of the array substrate to emit light toward the side of the array substrate.

In some embodiments, the display device further includes a reflector, wherein the reflector and the light source are on opposite sides of the display panel, respectively.

In some embodiments, the light source includes: a plurality of sub light sources emitting light of different colors;

the display device further includes: a field-sequential-color controller connected to each of the sub light sources, and configured to control each of the sub light sources to emit light by a field-sequential-color method.

In some embodiments, the light shielding layer is on the opposite substrate in the peripheral region; and the light source is on a lateral side of the array substrate to emit light towards the lateral side of the array substrate.

In some embodiments, the opposite substrate includes: a second substrate and a common electrode on the second substrate, wherein the common electrode is surrounded by the light shielding layer.

In some embodiments, the liquid crystal layer is any one of a polymer network liquid crystal layer, a polymer dispersed liquid crystal layer, and a polymer stabilized liquid crystal layer.

BRIEF DESCRIPTION OF DRAWINGS

The accompanying drawings, which are provided for further understanding of the present disclosure and constitute a part of this specification, are for explaining the present disclosure together with the following exemplary embodiments, but are not intended to limit the present disclosure. In the drawings.

DETAIL DESCRIPTION OF EMBODIMENTS

To make objects, technical solutions and advantages of the embodiments of the present disclosure more apparent, the technical solutions of the embodiments of the present disclosure will be clearly and completely described below with reference to the drawings of the embodiments of the present disclosure. It is to be understood that the described embodiments are only a few embodiments of the present disclosure, and not all embodiments. All other embodiments, which may be derived by a person skilled in the art from the described embodiments of the present disclosure without any inventive step, are within the scope of protection of the present disclosure.

The term used herein to describe embodiments of the present disclosure is not intended to limit and/or define the scope of the present disclosure. For example, unless otherwise defined, technical or scientific terms used herein shall have the ordinary meaning as understood by one of ordinary skill in the art to which this disclosure belongs. It should be understood that the terms "first," "second," and the like, as used in this disclosure, do not denote any order, quantity, or importance, but rather are used to distinguish one element from another. The singular forms "a," "an," or "the" and the like do not denote a limitation of quantity, but rather denote the presence of at least one, unless the context clearly dictates otherwise.

Figure 1:
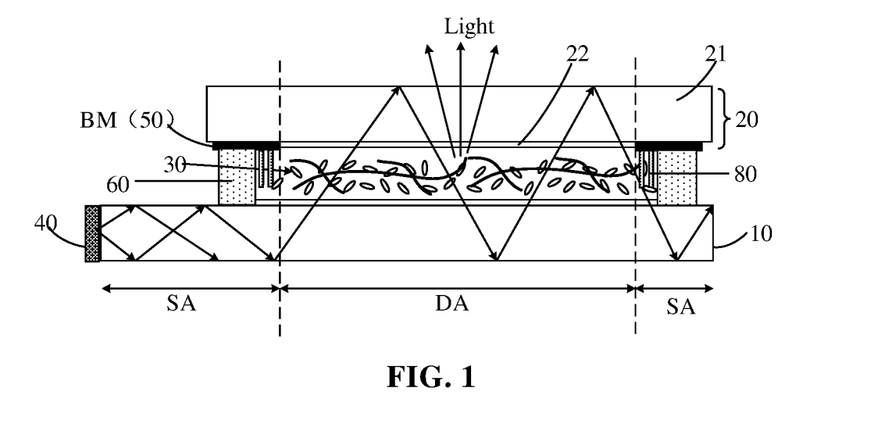
FIG. 1 is a display principle diagram of a transparent display device according to some embodiments of the present disclosure.

FIG. 1 is a display principle diagram of a transparent display device according to some embodiments of the present disclosure. As shown in FIG. 1, the transparent display device includes: a light source 40 and a display panel having a display region DA and a peripheral region SA. The display panel includes: an array substrate 10, an opposite substrate 20 and a liquid crystal layer 30, wherein the array substrate 10 and the opposite substrate 20 are arranged opposite to each other, and are provided with a frame sealing adhesive 60 therebetween in which a photo spacer 80 is provided. The liquid crystal layer 30 is disposed between the array substrate 10 and the opposite substrate 20, and is surrounded by the frame sealing adhesive 60. The array substrate 10 includes a first substrate, a transistor and an insulating layer and the like disposed on the first substrate (not shown in detail in FIG. 1); and the opposite substrate 20 includes a second substrate 21, a common electrode 22 and the like disposed on the second substrate 21. A light shielding layer 50 is provided on a side of at least one of the array substrate 10 and the opposite substrate 20 proximal to the liquid crystal layer 30, and an orthographic projection of the light shielding layer 50 on the array substrate 10 is in the peripheral region SA. The light source 40 is configured to emit light towards a side of the display panel, and the light enters the liquid crystal layer 30 from the side of the display panel.

The display panel includes a first surface and a second surface which are opposite to each other, and further includes a lateral side connected between the first surface and the second surface, wherein the first surface and the second surface are surfaces of the array substrate 10 and the opposite substrate 20 distal to each other, respectively. For example, the light source 40 is disposed on a side of the array substrate 10, and light enters from the side of the array substrate 10, is totally reflected in the array substrate 10, and then, enters the liquid crystal layer 30. Alternatively, the light source 40 is provided on a lateral side of the opposite substrate 20, and light enters from the side of the opposite substrate 20, is totally reflected in the opposite substrate 20, and then, enters the liquid crystal layer 30.

In an outer region of the frame sealing adhesive 60, light from the light source 40 is totally reflected in the array substrate 10 or the opposite substrate 20. However, at a position of the frame sealing adhesive 60 and a position of the liquid crystal layer 30, since the refractive indexes of the frame sealing adhesive 60 and the liquid crystal layer 30 are close to the refractive indexes of the array substrate 10 or the opposite substrate 20, the light may be incident into the frame sealing adhesive 60 and the liquid crystal layer 30.

The liquid crystal layer 30 is a Polymer Network Liquid Crystal (PNLC) layer, a Polymer Stabilized Liquid Crystal (PSLC) layer, or a Polymer Dispersed Liquid Crystal (PDLC) layer. Specifically, the liquid crystal layer 30 includes liquid crystal molecules, which may be nematic liquid crystal molecules, and a polymer network.

When no electric field is applied to the display panel, liquid crystal molecules in a same layer in the liquid crystal layer 30 are aligned uniformly. For a same beam of light, the refractive index does not change when propagating in the liquid crystal layer 30, so that light is not scattered, and the display panel is in a transparent state (i.e., does not display an image); when an electric field is applied to the display panel, the liquid crystal molecules have disordered orientation due to the polymer network, so that light is scattered. That is, in a process where the light is propagated in a horizontal direction in the liquid crystal layer 30, part of light exits the display panel, and a displayed image is seen on the light outgoing side of the display panel. In addition, assuming that a content of the polymer network is given, the stronger the electric field is, the greater the scattering degree of light is, and the greater the light emitting amount is. Therefore, the light emitting amount of respective pixels may be controlled by controlling the intensity of the electric field of respective pixels in the display panel, thereby realizing the image display.

In the present disclosure, the light shielding layer 50 is provided on a side of at least one of the array substrate 10 and the opposite substrate 20 proximal to the liquid crystal layer 30 and the orthographic projection of the light shielding layer 50 on the array substrate 10 is in the peripheral region, so that when the display panel is in the display state, even if some light leaks from the display panel, the light leakage in the peripheral region is greatly reduced under the light shielding effect of the light shielding layer 50, thereby improving the display effect.

As shown in FIG. 1, the light source 40 may be positioned at a lateral side of the array substrate 10 to emit light toward the side of the array substrate 10. The light shielding layer 50 is a light-absorbing layer, such as a black matrix BM. As shown in FIG. 1, the frame sealing adhesive 60 may be in contact with the light-absorbing layer 50.

Figure 2A:
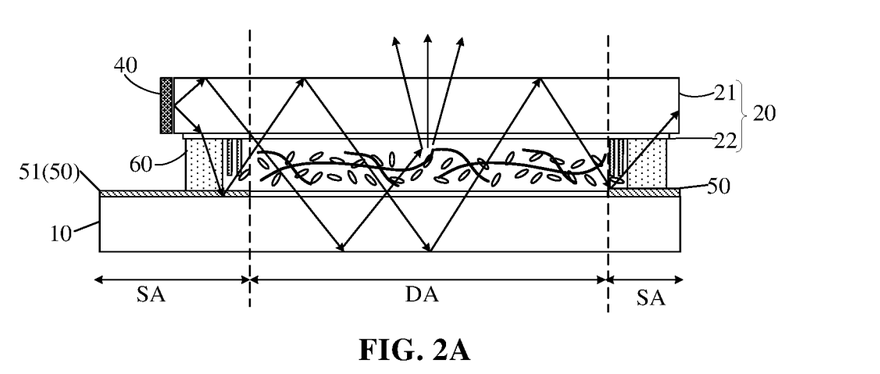
FIGS. 2A and 2B are schematic diagrams of a transparent display device according to some embodiments of the present disclosure, respectively.
Figure 2B:
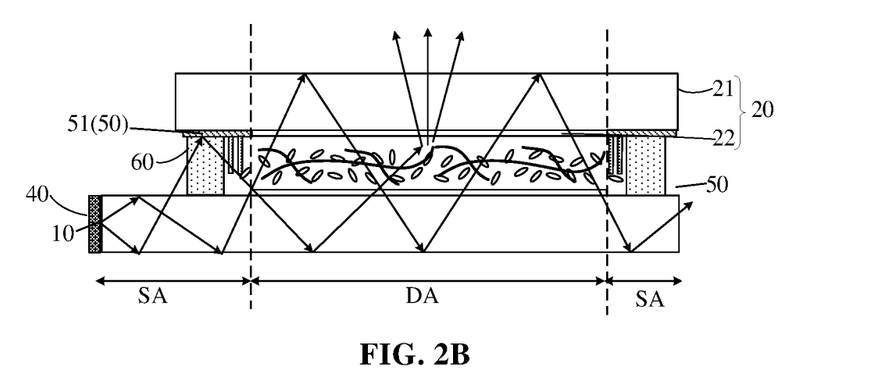

FIGS. 2A and 2B are schematic diagrams of a transparent display device according to some embodiments of the present disclosure, respectively. As shown in FIGS. 2A and 2B, the transparent display device includes: the light source 40, the display panel having the display region DA and the peripheral region SA surrounding the display region DA. The peripheral region SA may be at least a portion of an area between a boundary of the display region DA and an outer boundary of the display panel. The display panel includes: the array substrate 10, the opposite substrate 20 and the liquid crystal layer 30, wherein the array substrate 10 and the opposite substrate 20 are arranged opposite to each other, and are provided with the frame sealing adhesive 60 therebetween. The liquid crystal layer 30 is disposed between the array substrate 10 and the opposite substrate 20, and is surrounded by the frame sealing adhesive 60. The light source 40 is disposed on a lateral side of the display panel, and is configured to generate light which is incident into the liquid crystal layer 30 from the side of the display panel. Unlike FIG. 1, the light shielding layer 50 is a reflective layer 51. When light in the display panel are irradiated to the reflective layer 51, the light may be reflected by the reflective layer 51 into the liquid crystal layer 30.

In some embodiments, the reflective layer 51 may be made of a metal material with high reflectivity, such as aluminum, silver, and the like.

In the embodiment shown in FIGS. 2A and 2B, the reflective layer 51 is disposed on a side of the array substrate 10 proximal to the liquid crystal layer 30 and/or on a side of the opposite substrate 20 proximal to the liquid crystal layer 30, so that light is irradiated to the reflective layer 51, and then, is reflected, thereby reducing light leakage in the display panel and also improving light energy utilization efficiency. For example, as shown in FIG. 2B, when the light source 40 is disposed on the lateral side of the array substrate 10, the light is reflected back into the array substrate 10 by the reflective layer 51 on the opposite substrate 20, and is incident into the liquid crystal layer 30 after being totally reflected in the array substrate 10. Alternatively, the light leaking from the array substrate 10 is reflected by the reflective layer 51 on the opposite substrate 20 and then incident into the liquid crystal layer 30. As shown in FIG. 2A, when the light source 40 is disposed on the lateral side of the opposite substrate 20, the light is reflected back into the opposite substrate 20 by the reflective layer 51 on the array substrate 10, and is incident into the liquid crystal layer 30 after being totally reflected in the opposite substrate 20. Alternatively, the light leaking from the opposite substrate 20 is reflected by the reflective layer 51 on the array substrate 10 and then incident into the liquid crystal layer 30.

In some embodiments, as shown in FIG. 2A, the reflective layer 51 is disposed on a side of the array substrate 10 proximal to the liquid crystal layer 30. It is found through tests that when the reflective layer 51 is disposed on the side of the array substrate 10 of the display device in FIG. 1, the light leaking from the peripheral region may be reflected into the liquid crystal layer 30 due to the reflective layer 51, so that the light efficiency may be improved by about 15%. In addition, no light shielding layer is disposed on the opposite substrate 20, so that the frame sealing adhesive may be irradiated from the side of the opposite substrate to be cured in a procedure of manufacturing the display panel.

In some embodiments, as shown in FIG. 2A, the light source 40 is disposed on a lateral side of the opposite substrate 20, so as to improve light extraction efficiency of the opposite substrate 20 during displaying of the display panel. It is found through tests that when the light source 40 in FIG. 1 is disposed on the lateral side of the opposite substrate 20 (other structures remain unchanged), the light extraction efficiency on a side of the opposite substrate 20 distal to the array substrate 10 may be improved by 5%. It should be understood that the opposite substrate 20 has a bottom surface proximal to the array substrate 10 and a top surface distal to the array substrate 10, and the side of the opposite substrate 20 is: a surface connected between the top and bottom surfaces of the opposite substrate 20. The opposite substrate 20 includes the second substrate 21 and the common electrode 22 disposed on the second substrate 21, where the second substrate 21 may be a glass substrate, and the common electrode 22 is made of a transparent conductive material such as Indium Tin Oxide (ITO). The light source 40 may be opposite to the second substrate 21.

In some embodiments, the photo spacer 80 may be disposed between the array substrate 10 and the opposite substrate 20 to support the display panel. An orthographic projection of the at least one photo spacer 80 on the array substrate 10 is in an orthographic projection of the light shielding layer 50 on the array substrate 10.

Figure 3:
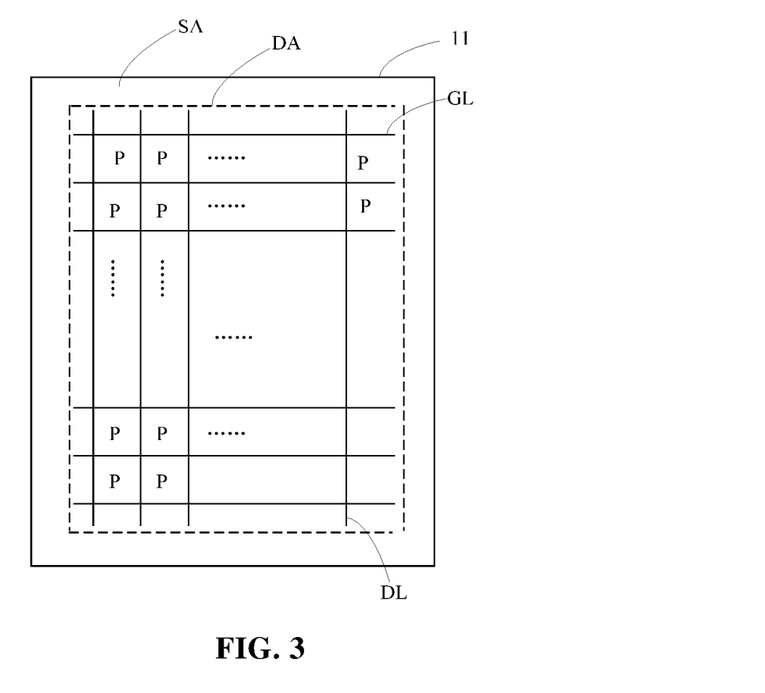
FIG. 3 is a schematic diagram illustrating respective regions of a display panel according to some embodiments of the present disclosure.
Figure 4:
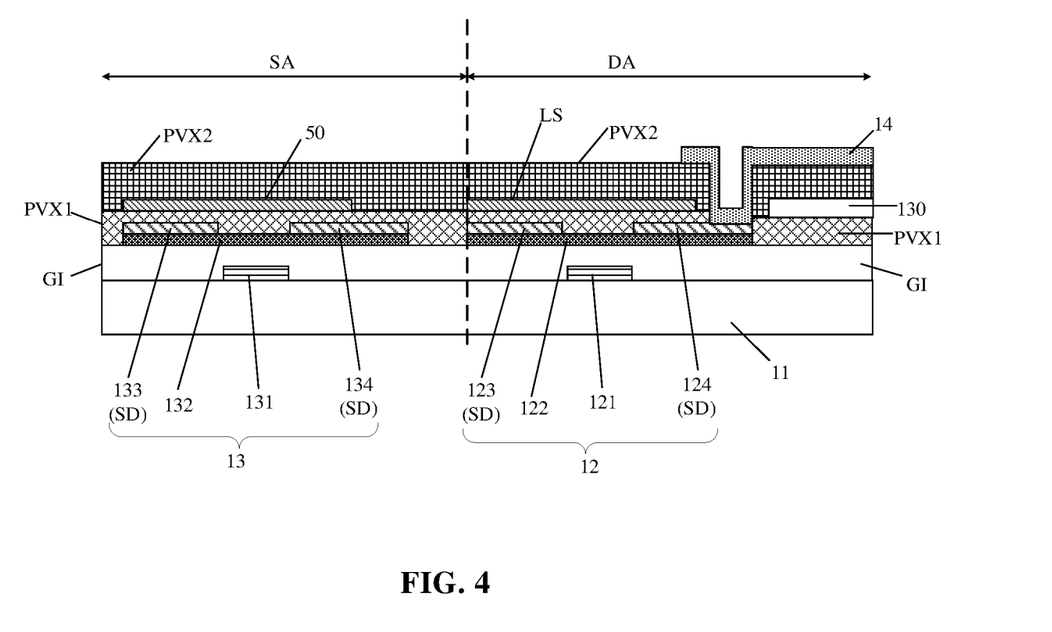
FIG. 4 is a schematic diagram of respective layers of an array substrate according to some embodiments of the present disclosure.

FIG. 3 is a schematic diagram illustrating respective regions of a display panel according to some embodiments of the present disclosure. FIG. 4 is a schematic diagram of respective layers of an array substrate according to some embodiments of the present disclosure. As shown in FIGS. 3 and 4, the array substrate 10 includes: a first substrate 11, a plurality of gate lines GL and a plurality of data lines DL disposed on the first substrate 11, crossing with each other and insulated and separated from each other, thereby dividing the display region DA into a plurality of pixels P. The array substrate 10 further includes: a second transistor 12 provided in each pixel P, and a driving circuit provided in the peripheral region SA, the driving circuit including a plurality of first transistors 13. The first transistors 13 and the second transistors 12 are provided on the first substrate 11.

As shown in FIG. 4, a gate 131 of the first transistor 13 and a gate 121 of the second transistor 12 are disposed on the first substrate 11, and are made of the same material which may include, for example, metal, a metal alloy, a metal nitride, a conductive metal oxide, a transparent conductive material, and the like. For example, the gate 131 of the first transistor 13 and the gate 121 of the second transistor 12 may include gold (Au), an alloy of gold, silver (Ag), an alloy of silver, aluminum (Al), an alloy of aluminum, aluminum nitride (AlNx), tungsten (W), tungsten nitride (WNx), copper (Cu), an alloy of copper, nickel (Ni), chromium (Cr), chromium nitride (CrNx), molybdenum (Mo), an alloy of molybdenum, titanium (Ti), titanium nitride (TiNx), or the like.

A gate insulating layer GI is located on a side of the gate of the first transistor 13 distal to the first substrate 11, and covers the gate 131 of the first transistor 13 and the gate 121 of the second transistor 12, and is made of silicon oxynitride (SiON), silicon oxide (SiOx), silicon nitride (SiNx), silicon oxycarbide (SiOxCy), silicon carbonitride (SiCxNy), aluminum oxide (AlOx), aluminum nitride (AlNx), tantalum oxide (TaOx), hafnium oxide (HfOx), zirconium oxide (ZrOx), titanium oxide (TiOx), or the like. In addition, the gate insulating layer GI may be a single layer or a multilayer.

A semiconductor layer is located on a side of the gate insulating layer GI distal to the first substrate 11, includes an active layer 132 of the first transistor 13 and an active layer 122 of the second transistor 12. The active layer 132/122 of each transistor includes: a source connection portion, a drain connection portion, and a channel portion between the source connection portion and the drain connection portion. The source connection portion is connected to a source 133/123 of the transistor including the source connection portion, and the drain connection portion is connected to a drain 134/124 of the transistor including the drain connection portion. A material of the active layer 122/132 may include, for example, an inorganic semiconductor material (e.g., polysilicon, amorphous silicon, etc.), an organic semiconductor material, an oxide semiconductor material. Each of the source connection portion and the drain connection portion may be doped with an impurity (e.g., an N-type impurity or a P-type impurity) having a higher impurity concentration than the channel portion. The channel portion is opposite to the gate 121/131 of the transistor. When a voltage signal applied to the gate 121/131 reaches a value, a carrier path is formed in the channel portion, so that the source 133/123 and the drain 134/124 of the transistor are turned on.

A source-drain electrode layer SD is located on a side of the semiconductor layer distal to the first substrate 11, and includes the source 133 and the drain 134 of the first transistor 13, and the source 123 and the drain 124 of the second transistor 12; the source 133 of the first transistor 13 is connected to the source connection portion of the first transistor 13, and the drain 134 of the first transistor 13 is connected to the drain connection portion of the first transistor 13; the source 123 of the second transistor 12 is connected to the source connection portion of the second transistor 12, and the drain 124 of the second transistor 12 is connected to the drain connection portion of the second transistor 12. The source-drain electrode layer SD may include a metal, an alloy, a metal nitride, a conductive metal oxide, a transparent conductive material, etc. For example, the source-drain electrode layer SD may be a single layer or a multilayer of a metal, such as Mo/Al/Mo or Ti/Al/Ti.

The first passivation layer PVX1 is located on a side of the source-drain electrode layer SD distal to the first substrate 11, covers the first transistor 13 and the second transistor 12, and may be made of a silicon compound, such as silicon oxide, silicon nitride, or silicon oxynitride.

In the display region DA, a light shielding block LS is provided on a side of the first passivation layer PVX1 distal to the first substrate 11, an orthographic projection of the light shielding block LS on the first substrate 11 covers at least an orthographic projection of the channel portion of the second transistor 12 on the first substrate 11. For example, an orthographic projection of the light shielding block LS on the first substrate 11 covers an orthographic projection of the channel portion of the second transistor 12 on the first substrate 11, and is located within an orthographic projection of the second transistor 12 on the first substrate 11. The light shielding block LS may prevent light in the display panel from irradiating the channel portion of the second transistor 12, and prevent the light from affecting the leakage current of the second transistor 12.

In the peripheral region SA, the light shielding layer 50 is provided on a side of the first passivation layer PVX1 distal to the first substrate 11, is located between the first transistor 13 and the liquid crystal layer 30, and an orthographic projection of the light shielding layer 50 on the first substrate 11 covers an orthographic projection of a channel portion of the first transistor 13 on the first substrate 11. The light shielding layer 50 may prevent light in the display panel from irradiating the channel portion of the first transistor 13, and prevent the light from affecting the leakage current of the first transistor 13.

The light shielding layer 50 and the light shielding block LS are arranged in a same layer and made of a same material, so that the light shielding layer 50 and the light shielding block LS may be manufactured through a same patterning process in the process of manufacturing the display panel, thereby simplifying the manufacturing process. Thicknesses of the light shielding layer 50 and the light shielding block LS may be the same as a thickness of the gate of the first transistor 13.

It should be noted that "in a same layer" in the present disclosure means that two structures are formed by a same material layer through a same patterning process, and thus the two structures are located in a same layer in the layer-to-layer relationship; which does not mean that distances between the first substrate 11 and the two structures must be the same.

A storage capacitor electrode 130 is disposed on a side of the first passivation layer PVX1 distal to the first substrate 11, is located in the display region DA, and may be made of a transparent material such as Indium Tin Oxide (ITO) and the like.

A second passivation layer PVX2 is provided on a side of the storage capacitor electrode 130 distal to the first substrate 11, and may be made of the silicon compound as described hereinbefore. The second passivation layer PVX2 may extend into the peripheral region SA. A pixel electrode 14 is provided at a position of each pixel P on the first substrate 11, is located on a side of the second passivation layer PVX2 distal to the first substrate 11, and is connected to the drain 124 of the second transistor 12 through a via extending through the first passivation layer PVX1 and the second passivation layer PVX2. The pixel electrode 14 and the storage capacitor electrode 130 are insulated and spaced by the second passivation layer PVX2, and form a storage capacitor.

Alternatively, the pixel electrode 14 may be made of a transparent conductive material such as Indium Tin Oxide (ITO) and the like.

As shown in FIG. 2, the opposite substrate 20 includes the second substrate 21 and the common electrode 22 disposed on the second substrate 21, and the common electrode 22 may be a planar electrode of a whole layer, which may be made of a transparent conductive material such as Indium Tin Oxide (ITO) and the like. When the display panel is driven to display, voltage signals are applied to the pixel electrode 14 and the common electrode 22, so as to apply an electric field to the liquid crystal layer 30.

In FIGS. 2A and 2B, the second substrate 21 may not be provided with a black matrix, so as to reduce the absorption of light by the black matrix and further improve the light utilization efficiency. That is, the common electrode 22 is located between the frame sealing adhesive 60 and the second substrate 21, and is directly in contact with the frame sealing adhesive 60. After testing, when the black matrix in FIG. 1 is removed, since no black matrix absorbs light, more light may be reflected into the liquid crystal layer in the display panel of FIGS. 2A and 2B, so that the light efficiency of the display device may be improved by about 50%.

Figure 5:
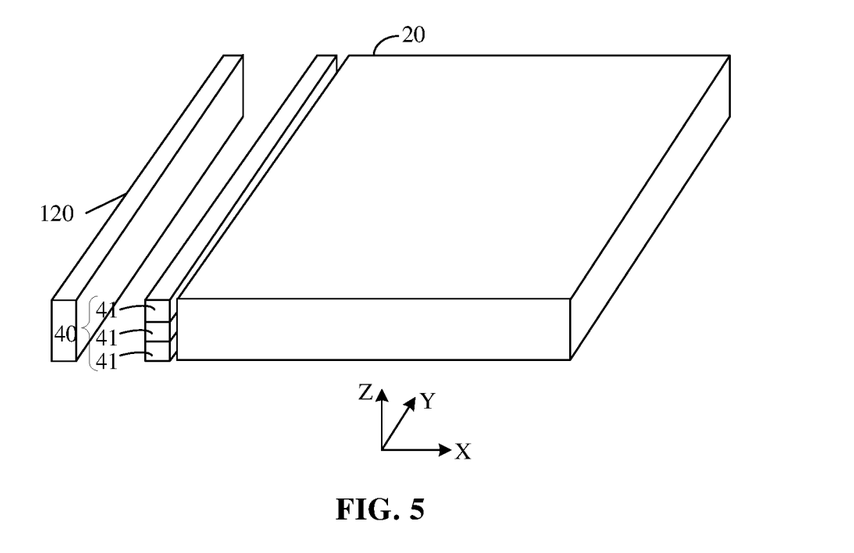
FIG. 5 is a schematic diagram illustrating a positional relationship between a light source and an opposite substrate according to some embodiments of the present disclosure.

In addition, in order to further improve the light utilization efficiency, in the present disclosure, color display is realized by a Field-Sequential-Color method, so that it is not necessary to provide a color filter on the second substrate 21 to prevent the color filter from absorbing light. FIG. 5 is a schematic diagram illustrating a positional relationship between a light source and an opposite substrate according to some embodiments of the present disclosure. As shown in FIG. 5, the light source 40 includes: the plurality of sub light sources 41 emitting light of different colors. The transparent display device further includes: a field-sequential-color controller 120 which is connected to each sub light source 41, and is configured to control each sub light source 41 to emit light by the field-sequential-color method, thereby providing the display panel with light of different colors.

It should be noted that, the case where the plurality of sub light sources 41 are arranged in a thickness direction (a Z direction) of the opposite substrate 20 in FIG. 5 is merely illustrative, and the plurality of sub light sources 41 may be arranged in other ways. For example, the plurality of sub light sources 41 are distributed in a width direction (a Y direction) of the opposite substrate 20.

It should be further noted that the case, where the number of the sub light sources in FIG. 5 is three, is merely illustrative, and does not limit the technical solution of the present disclosure. It will be described below by taking an example where the plurality of sub light sources 41 of the light source 40 are a red sub light source, a green sub light source, and a blue sub light source, respectively.

In the display panel, the pixels P in the display region DA constitute a plurality of pixel groups, each pixel group including: a red pixel, a green pixel, and a blue pixel. A display stage of each frame of picture is divided into: a first driving period, a second driving period, and a third driving period.

In the first driving period, the field-sequential-color controller 120 controls the red sub light source to emit light; a pixel voltage is applied to the pixel electrode 14 corresponding to the red pixel; the nematic liquid crystals in a region corresponding to the red pixel are rotated to present a scattering state; and the red pixel presents a corresponding gray scale according to a magnitude of the pixel voltage, that is, the red pixel emits red light. Meanwhile, no voltage is applied to the pixel electrodes 14 corresponding to the green pixel and the blue pixel, and the nematic liquid crystals in the corresponding regions are in an initial orientation to present a transmission state, i.e. neither the green pixel nor the blue pixel emits light.

Similarly, in the second driving period, the field-sequential-color controller 120 controls the green sub light source to emit light; the green pixel emits green light of a corresponding gray scale; and neither the red pixel nor the blue pixel emits light. In the third driving period, the field-sequential-color controller 120 controls the blue sub light source to emit light; the blue pixel emits blue light of a corresponding gray scale, and neither the red pixel nor the green pixel emits light.

Since each driving period only occupies one third of the time of each frame, human eyes cannot distinguish from the display effects during respective driving periods. Human eyes may feel the display effect corresponding to simultaneous light emission of three pixels P, that is, the display effect of one pixel group.

Figure 6:
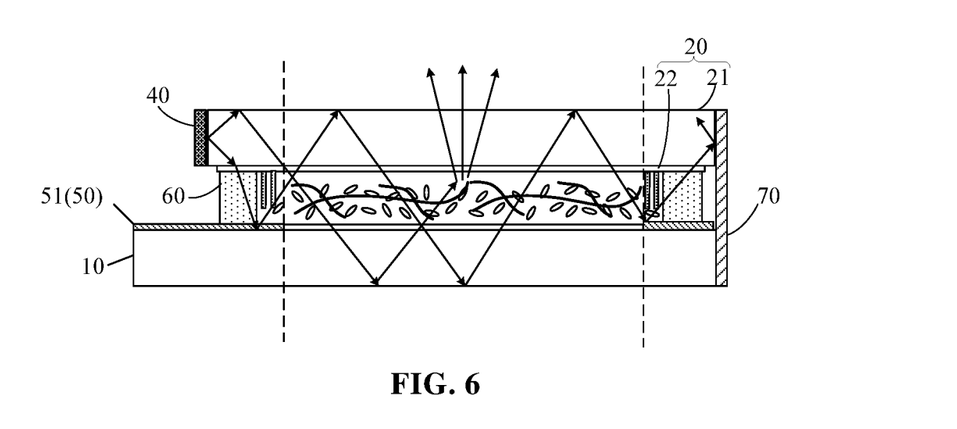
FIG. 6 is a schematic diagram of a transparent display device according to some embodiments of the present disclosure.

In the embodiment of the present disclosure, the light source 40 is disposed at a lateral side of the display panel, so that in a case where the display panel displays an image, as a light path increases in length, the total energy scattered by the light gradually attenuates when the light propagates in the liquid crystal layer 30, which easily causes poor display uniformity at positions close to the light source 40 and at positions far from the light source 40. To improve this problem, the present disclosure further provides another transparent display device. FIG. 6 is a schematic diagram of a transparent display device according to further embodiments of the present disclosure. Unlike the transparent display device shown in FIG. 2, in FIG. 6, the transparent display device further includes a reflector 70, and the reflector 70 and the light source 40 are respectively located at two opposite sides of the display panel. Thus, when the light from the light source 40 is irradiated to the opposite side of the display panel, the light may be reflected back to the liquid crystal layer 30 by the reflector 70 to be used again, thereby improving the light utilization efficiency and the display uniformity of the display panel. Through tests, when the reflector is arranged opposite to the light source 40 in FIG. 1, the light utilization efficiency of the transparent display device may be improved by 30% with the reflection of the reflector. Similarly, the light utilization efficiency of the transparent display device in FIG. 6 is improved compared with that of the transparent display device in FIGS. 2A and 2B. Through tests, compared with FIG. 1, the reflective layer 51 and the reflector 70 of the transparent display device shown in FIG. 6 have a reflective function, and no black matrix is provided, so that the light absorption is reduced. In addition, the light source 40 is provided at the side of the opposite substrate 20, so that when viewing from a side of the opposite substrate 20 distal to the array substrate 10, the brightness of the display device is improved. Compared with the structure of FIG. 1, when the transparent display device is in the transparent state, the brightness of the transparent display device in FIG. 6 may be doubled.

Alternatively, the reflector 70 is made of a metal material (e.g., aluminum, silver, etc.) having high reflectivity, and the reflector 70 may be a reflective sheet.

It should be noted that, in FIG. 1, a specific structure of the array substrate 10 may be described with reference to the structure of the array substrate 10 in FIG. 2A and FIG. 2B, except that the light shielding layer in FIG. 2A and FIG. 2B is absent in the array substrate 10 in FIG. 1.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display device, comprising:
   a display panel having a display region and a peripheral region surrounding the display region, the display panel comprising: an array substrate, an opposite substrate and a liquid crystal layer, wherein the array substrate and the opposite substrate are opposite to each other, the liquid crystal layer is between the array substrate and the opposite substrate, a light shielding layer is on a side of the array substrate close to the liquid crystal layer, and an orthographic projection of the light shielding layer on the array substrate is located in the peripheral region; and
   a light source configured to emit light to a lateral side of the display panel, the light being incident into the liquid crystal layer from the lateral side of the display panel;

the light shielding layer is a reflective layer;

the light source is on a lateral side of the opposite substrate, which is on a light outing side of the display device, to emit light towards the lateral side of the opposite substrate; and the light shielding layer is directly arranged on the array substrate in the peripheral region, to reflect a part of the light emitted from the light source, irradiated onto the light shielding layer, back to the opposite substrate so as to improve light extraction efficiency of the opposite substrate during displaying of the display panel.

2. The display device of claim 1, wherein the array substrate comprises: a first substrate and a first transistor on the first substrate, wherein the first transistor is in the peripheral region, the light shielding layer is between the first transistor and the liquid crystal layer, and an orthographic projection of the light shielding layer on the first substrate covers an orthographic projection of a channel portion of the first transistor on the first substrate.

3. The display device of claim 2, wherein a plurality of pixels are in the display region, and the display device further comprises:

a second transistor on the first substrate at a position corresponding to each of the pixels, an active layer of the second transistor comprising: a source connection portion, a drain connection portion, and a channel portion between the source connection portion and the drain connection portion, the source connection portion being connected to a source of the second transistor, the drain connection portion being connected to a drain of the second transistor; and a first passivation layer on a side of the second transistor distal to the first substrate, wherein a light shielding block is on a side of the first passivation layer distal to the first substrate, and an orthographic projection of the light shielding block on the first substrate at least covers an orthographic projection of the channel portion of the second transistor on the first substrate.

4. The display device of claim 3, further comprising: a pixel electrode on the first substrate at a position corresponding to the pixel, and a second passivation layer on a side of the light shielding block distal to the first substrate; wherein the pixel electrode is on a side of the second passivation layer distal to the first substrate and is connected to a drain of the second transistor through a via extending through the first passivation layer and the second passivation layer; and a storage capacitor electrode between the first passivation layer and the second passivation layer, wherein the storage capacitor electrode and the pixel electrode form a storage capacitor.

5. The display device of claim 3, wherein the light shielding block and the light shielding layer are in a same layer and made of a same material.

6. The display device of claim 4, wherein the display panel further comprises a frame sealing adhesive between the array substrate and the opposite substrate, the frame sealing adhesive surrounds the liquid crystal layer, and an orthographic projection of the frame sealing adhesive on the array substrate is within an orthographic projection of the light shielding layer on the array substrate.

7. The display device of claim 6, wherein the opposite substrate comprises: a second substrate and a common electrode on the second substrate, wherein the common electrode is between the frame sealing adhesive and the second substrate and is in contact with the frame sealing adhesive.

8. The display device of claim 7, wherein the light shielding layer is a metal layer.

9. The display device of claim 8, further comprising a reflector, wherein the reflector and the light source are on opposite sides of the display panel, respectively.

10. The display device of claim 9, wherein the light source comprises: a plurality of sub light sources emitting light of different colors;

the display device further comprises: a field-sequential-color controller connected to each of the sub light sources, and configured to control each of the sub light sources to emit light by a field-sequential-color method.

11. The display device of claim 1, wherein the liquid crystal layer is any one of a polymer network liquid crystal layer, a polymer dispersed liquid crystal layer, and a polymer stabilized liquid crystal layer.

* * * * *